United States Patent [19]

Sturgeon

[11] Patent Number: 5,208,739
[45] Date of Patent: May 4, 1993

[54] INTEGRATED MAGNETIC POWER CONVERTER

[75] Inventor: Clayton L. Sturgeon, Dallas, Tex.

[73] Assignee: Powercube Corporation, Billerica, Mass.

[21] Appl. No.: 817,600

[22] Filed: Jan. 7, 1992

[51] Int. Cl.[5] .......................................... H02M 3/335
[52] U.S. Cl. ...................................... 363/24; 363/22; 363/16
[58] Field of Search ................ 363/20, 16, 21, 22, 363/24, 25; 323/355, 362; 336/214, 215

[56] References Cited

U.S. PATENT DOCUMENTS

| | | | |
|---|---|---|---|
| 3,553,620 | 12/1967 | Cielo et al. | 336/165 |
| 3,694,726 | 9/1972 | Cielo et al. | 321/26 |
| 4,184,197 | 1/1980 | Cuk et al. | 363/40 |
| 4,186,437 | 1/1980 | Cuk | 363/16 |
| 4,257,087 | 3/1981 | Cuk | 363/40 |
| 4,262,328 | 4/1981 | Bloom et al. | 363/39 |
| 4,274,133 | 6/1981 | Cuk et al. | 363/20 |
| 4,355,352 | 10/1982 | Bloom et al. | 363/39 |
| 4,675,796 | 6/1987 | Gautherin et al. | 363/24 |
| 4,734,839 | 3/1988 | Barthold | 363/21 |
| 4,774,649 | 9/1988 | Archer | 363/97 |
| 4,821,163 | 4/1989 | Bloom | 363/97 |
| 4,853,668 | 8/1989 | Bloom | 336/170 |
| 4,858,093 | 8/1989 | Sturgeon | 363/16 |
| 4,864,478 | 9/1989 | Bloom | 363/47 |
| 4,969,081 | 11/1990 | Shekhawat et al. | 363/56 |
| 4,994,952 | 2/1991 | Silva et al. | 363/56 |

OTHER PUBLICATIONS

Bloom, Ed, "New integrated-magnetic dc-dc power converter circuits and systems," *Powertechnics Magazine*, Mar. 1987, pp. 33-36.

Cucconi, Alan and Cuk, Slobodan, "Design of a 2KW, 100 KHz Switching Regulator for Space Shuttle," *Proceedings of the Fifth International PCI '82 Conference*, Sep. 28-30, 1982, pp. 195-210.

Severns, Rudy, "High Frequency Converters with Non Pulsating Input and Output Currents," *Technical Papers of the Fifth International High Frequency Power Conversion 1990 Conference*, May 6-11, 1990, pp. 195-210.

*Primary Examiner*—Steven L. Stephan
*Assistant Examiner*—Ben M. Davidson
*Attorney, Agent, or Firm*—Ross, Howison, Clapp & Korn

[57] ABSTRACT

An integrated magnetic power converter for supplying power to a load includes a continuous magnetic structure having first and second legs and a magnetic path therebetween. Two transformers and two inductor devices are included on the core. The converter operates in four states determined by the state of two switches coupled to the transformer.

7 Claims, 13 Drawing Sheets

INTEGRATED MAGNETIC POWER CONVERTER

TECHNICAL FIELD OF THE INVENTION

This invention relates to power systems and devices, and more particularly to a combined multiple transformer and multiple inductor integrated magnetic power converter.

BACKGROUND OF THE INVENTION

The combination of an inductive as well as a transformer elements of a power converter on a single core structure is referred to as magnetic integration. The consolidated magnetic system, if integrated properly, has the desired characteristics of the original converter circuit. In many instances, magnetic integration will also produce a converter arrangement which achieves reduced voltage stress on semiconductors. Various integrated magnetic power converter circuits and systems have been suggested in which multiple windings and circuit elements are required. Such systems further require windings on an air-gap leg of the core. As a result, the systems are relatively costly due to the number of components required and manufacturing costs involved. Additionally, problems exist with leakage induction between primary and secondary windings, lowering the efficiency of such power converters.

A need has thus arisen for an integrated magnetic power converter with improved electrical efficiency, and flexibility with material efficiency which is simple in design. Additionally, a need has arisen for an integrated magnetic power converter which is capable of efficient operation at high frequencies.

SUMMARY OF THE INVENTION

In accordance with the present invention, an integrated magnetic power converter for supplying power to a load is provided. The power converter includes a continuous magnetic structure having first and second legs and a magnetic path therebetween. A first winding is wound on the first leg. A second winding is wound on the second leg and is connected to the load. A third winding in series with the second winding is wound on the first leg. A first circuit is connected to the first winding for supplying energy to the power converter. A second circuit is connected to the second and third windings, and a third circuit is connected to the second and third windings for alternately transferring energy to the load. When energy is supplied to the first winding, a magnetic flux is produced in the magnetic path for transferring energy to the load via the second winding and the third circuit, and an amount of energy is stored in the area surrounding the magnetic structure and the magnetic path. When energy supplied to the first winding is removed, the stored energy induces a magnetic flux in the magnetic path and power is transferred to the load via the second and third windings and the second circuit. A fourth winding is wound on the second leg. A fifth winding is wound on the first leg and is connected to the load. A sixth winding in series with the fifth winding is wound on the second leg. A fourth circuit is connected to the fourth winding for supplying energy to the power converter. A fifth circuit is connected to the fifth and sixth windings, and a sixth circuit is connected to the fifth and sixth windings for alternately transferring energy to the load. When energy is supplied to the fourth winding, a magnetic flux is produced in the magnetic path for transferring energy to the load via the fifth winding and the sixth circuit, and an amount of energy is stored in the area surrounding the magnetic structure and the magnetic path. When energy supplied to the fourth winding is removed, the stored energy induces a magnetic flux in the magnetic path and power is transferred to the load via the fifth and sixth windings and the fifth circuit.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
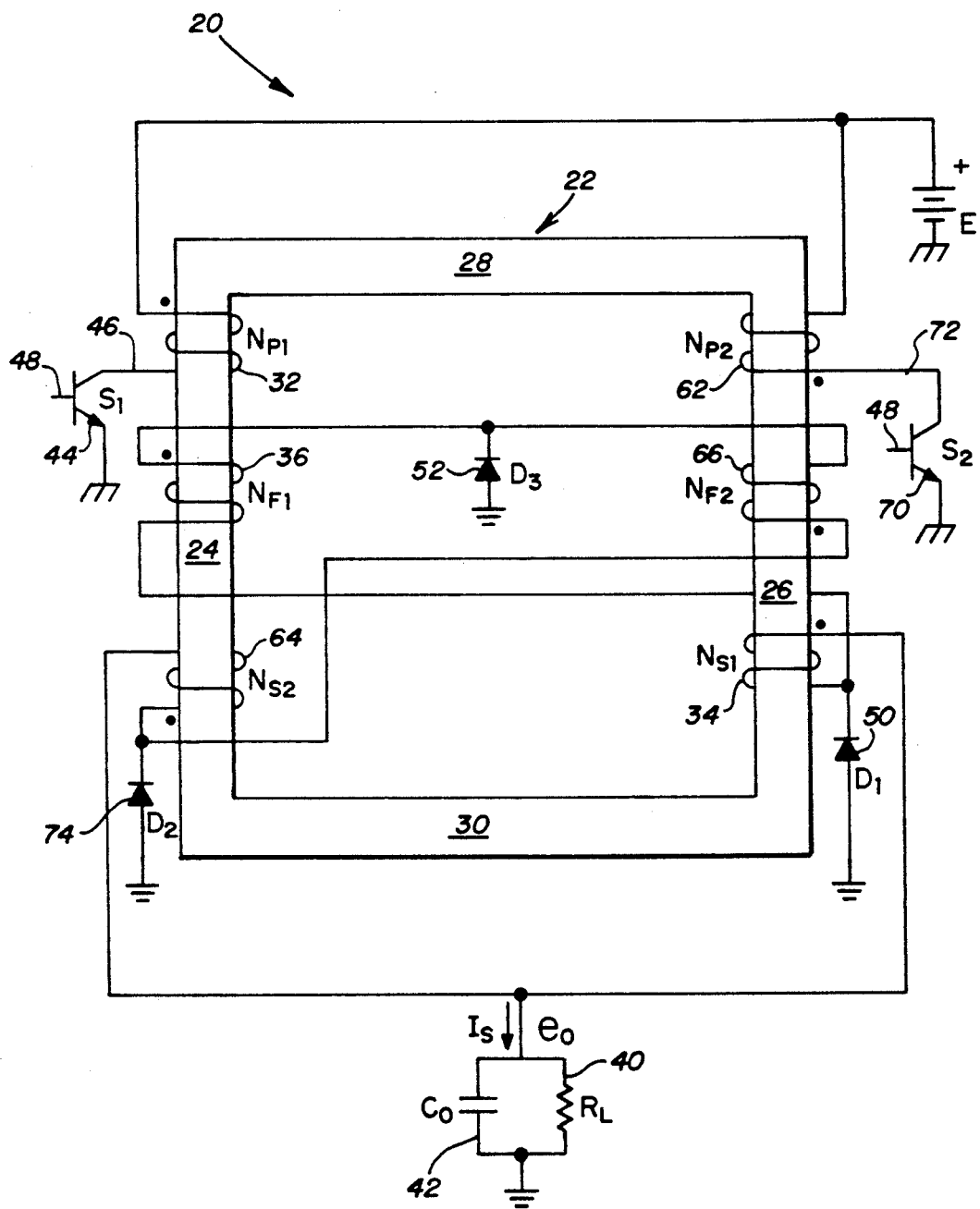
FIG. 1 is a schematic and electrical circuit diagram of an integrated magnetic power converter in accordance with the push pull embodiment of the present invention.
Figure 2:
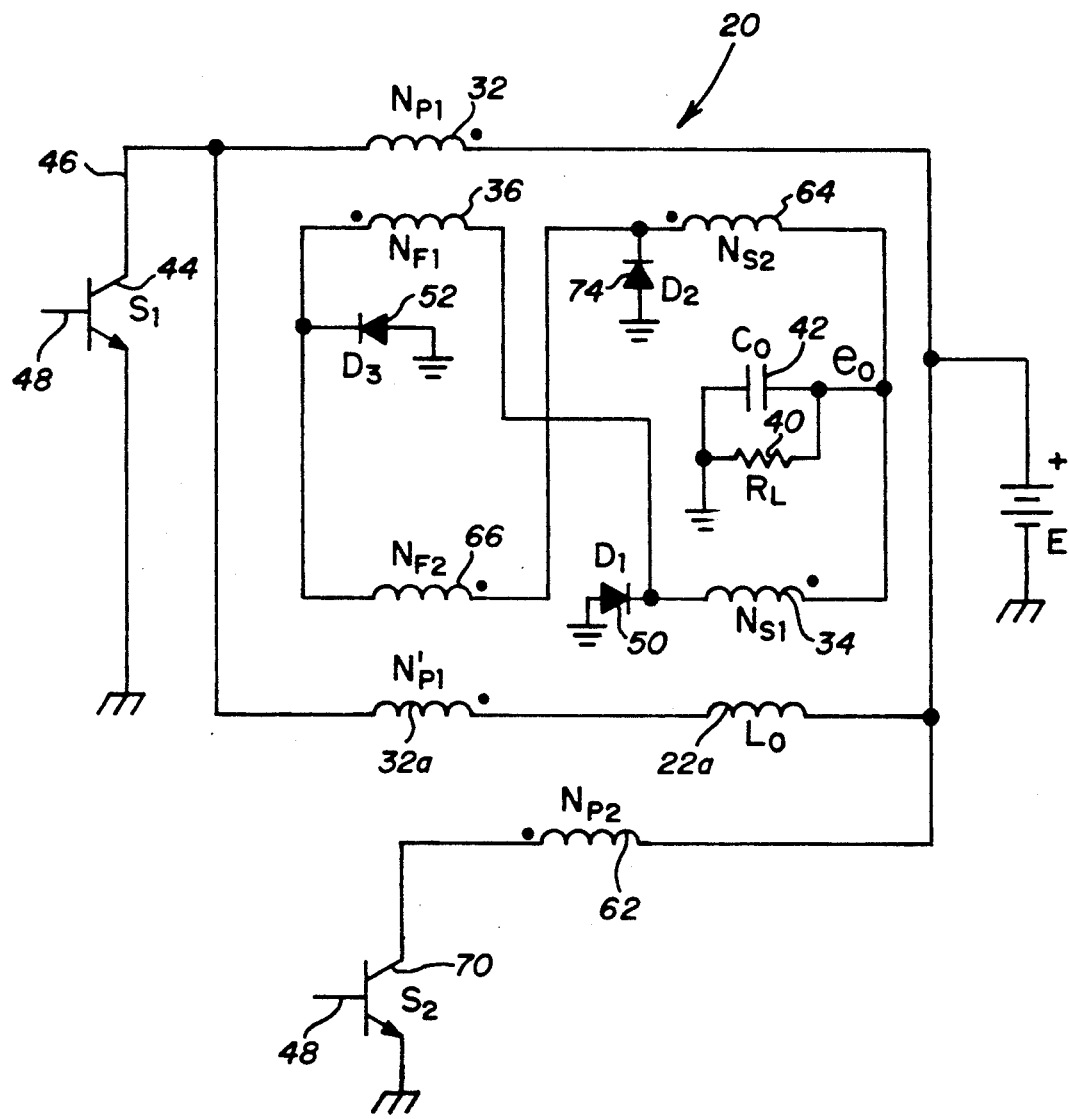
FIG. 2 represents an electric circuit equivalent of the integrated magnetic power converter shown in FIG. 1.

Referring to FIGS. 1 and 2, a push pull embodiment of the present integrated magnetic power converter is illustrated, and is generally identified by the numeral 20. Integrated magnetic power converter 20 combines two transformer and two inductor devices in a single magnetic structure having a continuous core, generally identified by the numeral 22, of magnetic material. Core 22 includes a first leg 24, a second leg 26, a third leg 28, and a fourth leg 30. Core 22 may be shaped, for example, in the form of a toroid.

Reference numerals as well as alpha-numerical designations will be used throughout the Description and Drawings for easier identification of components.

A primary winding 32 is wound around leg 24. A first secondary winding 34 is wound around leg 26, and a second secondary winding 36 is wound around leg 24. Secondary windings 34 and 36 are connected in series around core 22.

The manner in which the windings of primary and secondary windings, 32, 34 and 36, respectively, are wound on their respective legs to illustrate their respective polarities is according to the dot notation. Primary winding 32 is wound in the same direction as second secondary winding 36 around leg 24. FIG. 2 is an electric circuit model of the actual circuit of FIG. 1 with all windings referenced to winding 32. Energy storage inductor Lo (22a) is not a winding but is the result of leakage flux of windings 32 and 36 to winding 34 and leakage flux of windings 62 and 66 to winding 64. The exciting inductances of the circuit are omitted for clarity, but would appear as very large inductances in parallel with windings 32 and 32a, and do not contribute to the power conversion process or the invention.

The output of the first secondary winding 34 is coupled to a load 40 which is connected between the output of the first secondary winding 34 and ground potential. Connected across load 40 is a filtering capacitor 42.

A power source E is applied to the input of primary winding 32 on first leg 24. The power source may comprise for example, a DC source which is converted into an AC signal through the operation of a switch 44, which is serially connected to the output of primary winding 32 by a signal line 46. Switch 44 may comprise for example a transistor whose collector is connected to the output of primary winding 32, the emitter at ground potential and the base connected to a control circuit 48. It will be understood that control circuit 48 may be of a conventional form for detecting variations across load 40 and for providing appropriate regulation control output signals to switch 44. Control circuit 48 may comprise, for example, a pulse width modulator.

Interconnected in series with the in-phase side of the second secondary winding 36 and the in-phase side of first secondary winding 34 is a rectifier element or diode 50. Connected from ground to second secondary winding 36 and in series with first secondary winding 34 is a rectifier element or diode 52.

A primary winding 62 is wound around leg 26. A first secondary winding 64 is wound around leg 24, and a second secondary winding 66 is wound around leg 26. Secondary windings 64 and 66 are connected in series around core 22.

The manner in which the windings of primary and secondary windings, 62 and 64 and 66, respectively, are wound on their respective legs to illustrate their respective polarities is according to the dot notation. Primary winding 62 is wound in the same direction as second secondary winding 66 around leg 26. Windings 62, 64, and 66 are wound in the opposite directions of windings 32, 34, and 36, respectively.

The output of first secondary winding 64 is coupled to load 40.

Power source E is also applied to the input of primary winding 62 on first leg 26, whose output is converted into an AC signal through the operation of a switch 70, which is serially connected to the output of primary winding 62 by a signal line 72. Switch 70 may comprise for example a transistor whose collector is connected to the output of primary winding 62, the emitter at ground potential and the base connected to control circuit 48.

Interconnected in series with the in-phase side of the second secondary winding 64 and the in-phase side of first secondary winding 66 is a rectifier element or diode 74. Connected from ground to second secondary winding 66 and in series with first secondary winding 64 is rectifier element or diode 52.

The number of turns of windings 32, 32a and 62 are all equal, and will be represented by the designation $N_P$ in the equations throughout this description. The number of turns of windings 34, 64, 36 and 66 are all equal and will be represented by the designation $N_s$ in equations throughout this description. In FIG. 2, windings 32, 36, and 64 are magnetically coupled, but are not coupled to windings 32a, 66, 34, and 62. Windings 32a, 66, 34, and 62 are magnetically coupled, but are not coupled to windings 32, 36 and 64.

Figure 5A:
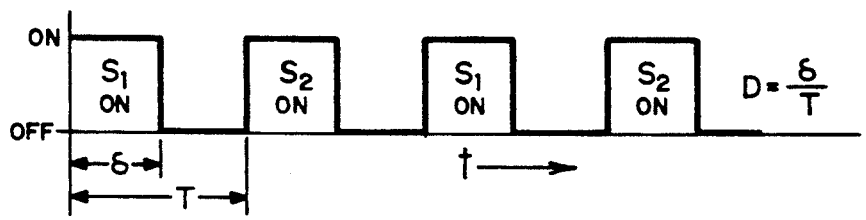
FIG. 5 is a plurality of timing diagrams illustrating the waveforms of pertinent signals of the circuit shown in FIG. 3.
Figure 5B:
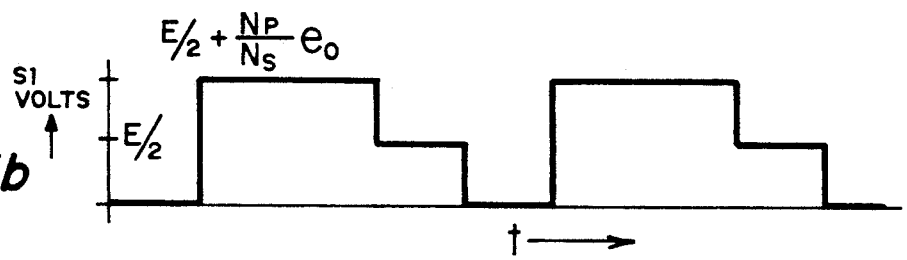
Figure 5C:
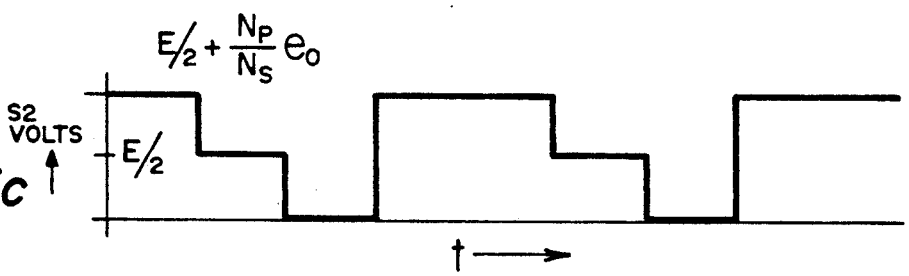
Figure 5D:
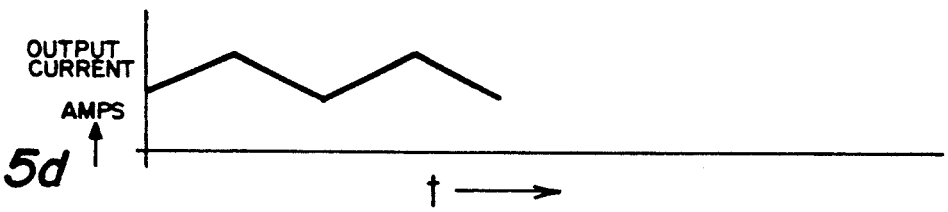
Figure 5E:
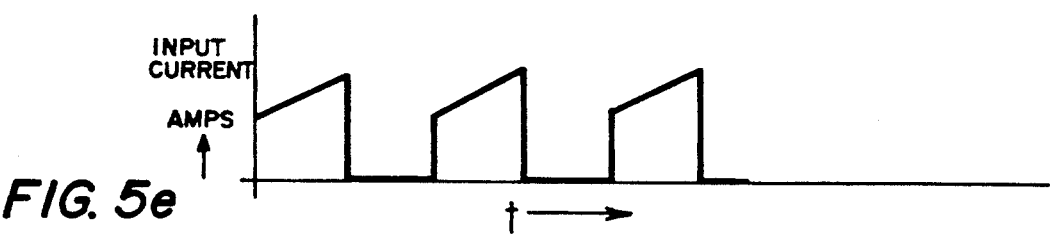
Figure 12A:
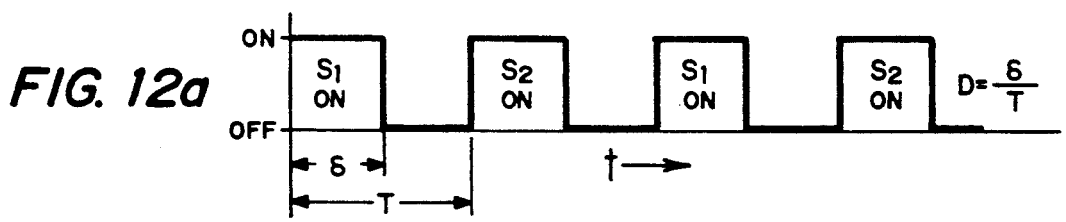
FIGS. 12 and 13 are a plurality of timing diagrams illustrating the waveforms of pertinent signals of the circuit shown in FIG. 10.
Figure 12B:
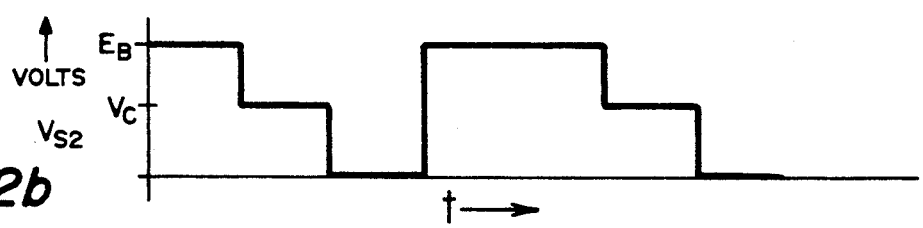
Figure 12C:
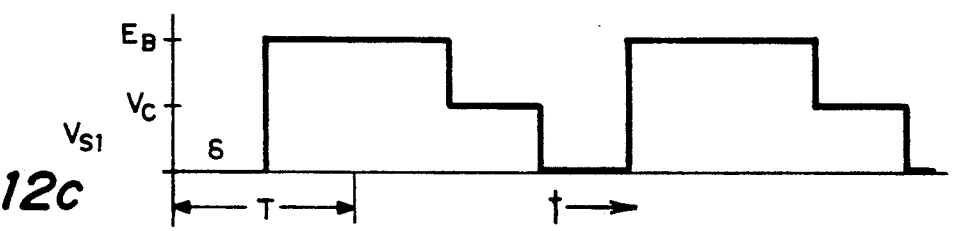
Figure 12D:
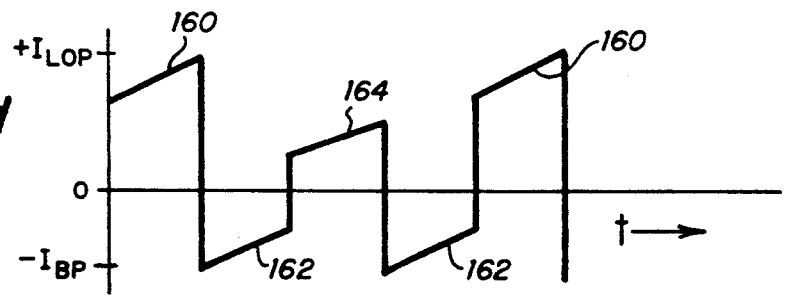
Figure 12E:
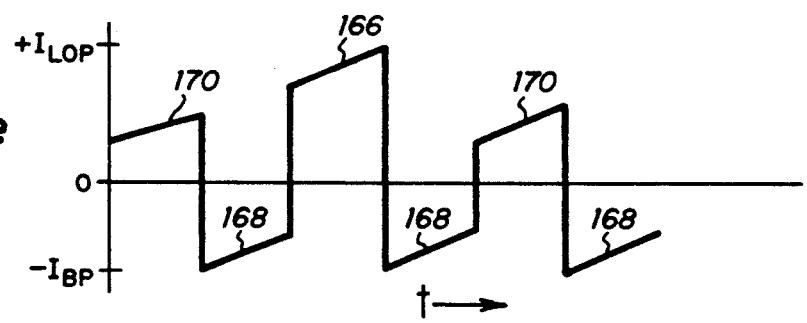

The Duty Ratio, D, as used throughout this Description is defined as follows:

$$D = \frac{\delta}{T} \tag{1}$$

Where $\delta$ represents the time a switch 44 or 70 is on; and T represents the time a switch 44 or 70 is on plus the time it is off divided by two, as shown in FIGS. 5a and 12a.

The operation of the present power converter 20 will now be described. When switch 44 is on, energy is transferred through the magnetic system of power converter 20 from primary winding 32 to first secondary winding 34 to load 40. Flux builds up within and around core 22. During the on time of switch 44, current flowing through diode 50 increases and current flowing through first secondary winding 34 increases. Due to the phasing relationships of the windings on leg 24, diode 52 is back biased and does not conduct during intervals when switch 44 is on. Further, no current flows through second secondary winding 36 of leg 24. During conduction of switch 44, inductive energy is stored in the area surrounding core 22. This area forms a distributed air gap for storage of this inductive energy, requiring no gapped leg of core 22.

During the off time interval of switch 44, the winding polarities of primary winding 32 and second secondary winding 36 reverse, and diode 52 is forward biased and now conducts. Diode 52 provides a path to first secondary winding 34 for transferring the inductive energy stored around core 22. The current flowing within diode 50 is zero, whereas the current flowing within diode 52 initially increases to a maximum when switch 44 is turned off and thereafter decreases. Current flows in both first and second secondary windings 34 and 36, respectively, since diode 52 is now forward-biased to produce an output current $I_s$ which is decreasing in magnitude. It therefore can be seen that the repetitive pattern of switch 44 being on and off results in a continuous output current which increases and decreases when applied to load 40.

Switches 44 and 70 are both off at the same time, but on at different times When switch 70 is on, energy is transferred through the magnetic system of power core 22. During the on time of switch 70, current flowing through diode 74 increases and current flowing through first secondary winding 64 increases. Due to the phasing relationships of the windings on leg 26, diode 52 is back biased and does not conduct during intervals when switch 70 is on. Further, no current flows through second secondary winding 66 of leg 26. During conduction of switch 70, inductive energy is stored in the area surrounding core 22.

During the off time interval of switch 70, the winding polarities of primary winding 62 and second secondary winding 66 reverse, and diode 52 is forward biased and now conducts. Diode 52 provides a path to first secondary winding 64 for transferring the inductive energy stored around core 22. The current flowing within diode 74 is zero, whereas the current flowing within diode 52 initially increases to a maximum when switch 70 is turned off and thereafter decreases. Current flows in both first and second secondary windings 64 and 66, respectively, since diode 52 is now forward-biased to produce an output current $I_s$ which is decreasing in magnitude. It therefore can be seen that the repetitive pattern of switch 70 being on and off results in a continuous output current which increases and decreases when applied to load 40.

The operation of switches 44 and 70 are further described with respect to FIG. 2 of U.S. Pat. No. 4,858,093, the description of which is hereby incorporated by reference. Switches 44 and 70 are easily driven since the emitters of switches 44 and 70 are both connected to primary ground. The input voltage (E) is not divided as with half bridge topologies, and therefore the D.C. gain of converter 20 is higher.

The D.C. transfer function of converter 20 is given by:

$$e_o = \frac{N_S}{N_P} ED \quad (2)$$

Figure 3:
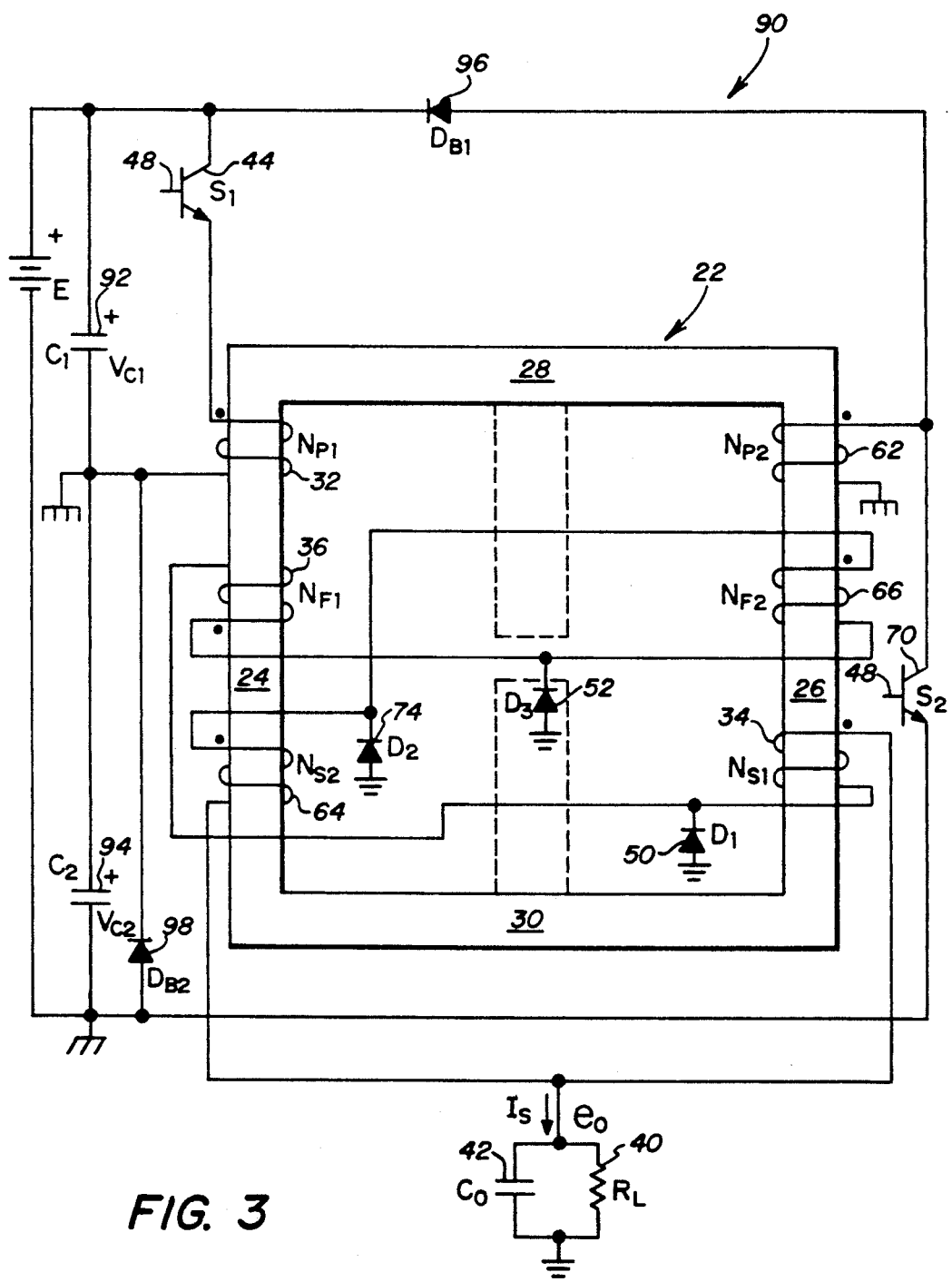
FIG. 3 is a schematic and electrical circuit diagram of an integrated magnetic power converter in accordance with the half bridge embodiment of the present invention.
Figure 4:
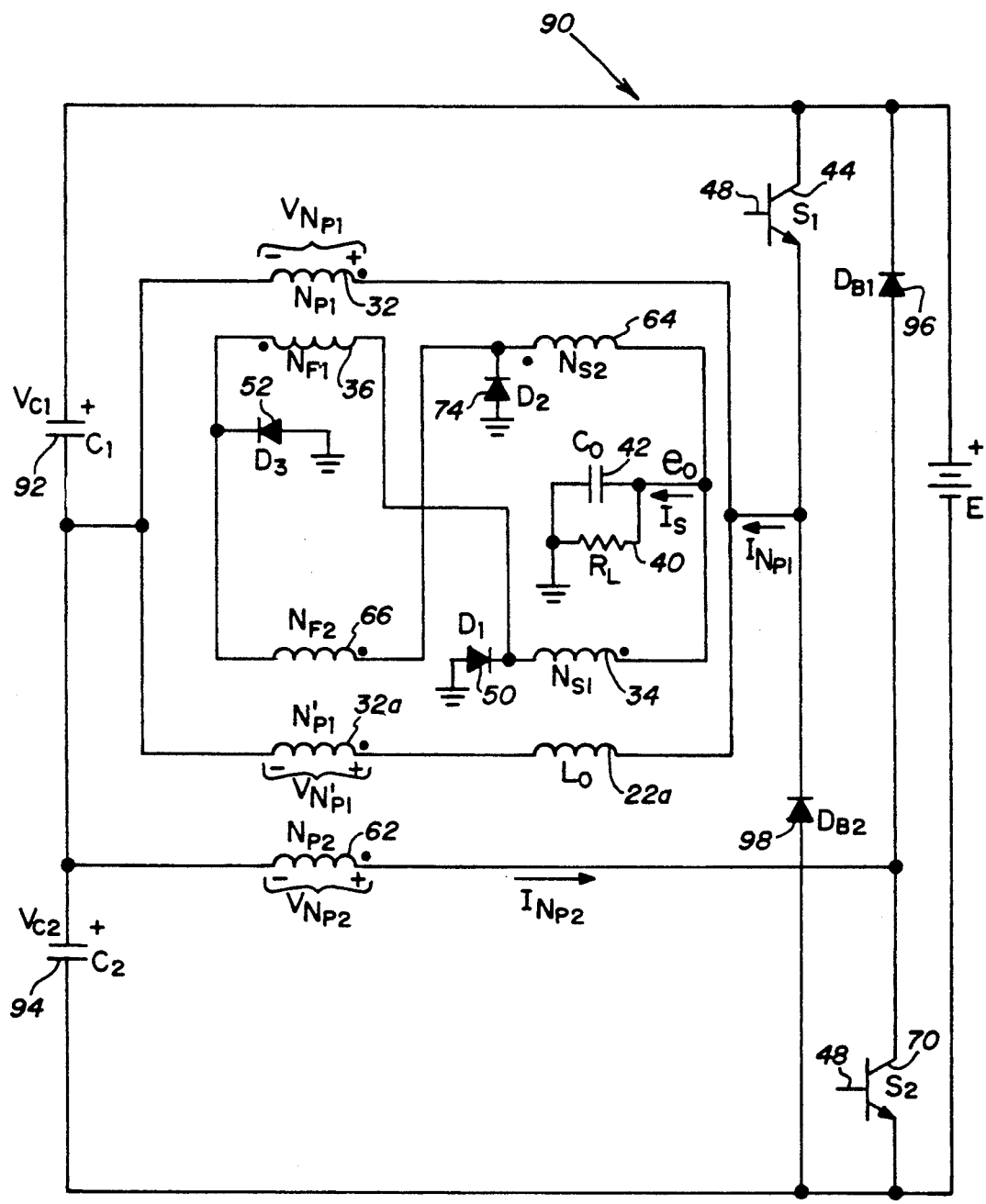
FIG. 4 represents an electric circuit equivalent of the integrated magnetic power converter shown in FIG. 3.

Referring now simultaneously to FIGS. 3 and 4, a half bridge embodiment of the present integrated magnetic converter is illustrated, and is generally identified by the numeral 90. Like reference numerals are utilized for like and corresponding components previously identified with respect to converter 20 (FIG. 1).

Interconnected across power supply E are capacitors 92 and 94. The emitter of switch 44 is interconnected to winding 32, unlike the connection of switch 44 in FIG. 1.

In operation, diodes 96 and 98 clamp the leakage inductance spikes when switches 44 and 70 turn off, respectively.

The D.C. transfer function of converter 90 is given by:

$$e_o = \frac{N_S}{N_P} D \frac{E}{2} \quad (3)$$

Converter 90 is suitable for relatively high input voltages since the voltage of the power supply is divided by 2 in Equation 3. The input current is pulsating and the output current is continuous.

FIG. 5 illustrates various waveforms for the operation of converter 90. In FIG. 5b, $S_1$ represents the voltage drop across switch 44. In FIG. 5c, $S_2$ represents the voltage drop across switch 70.

Figure 6:
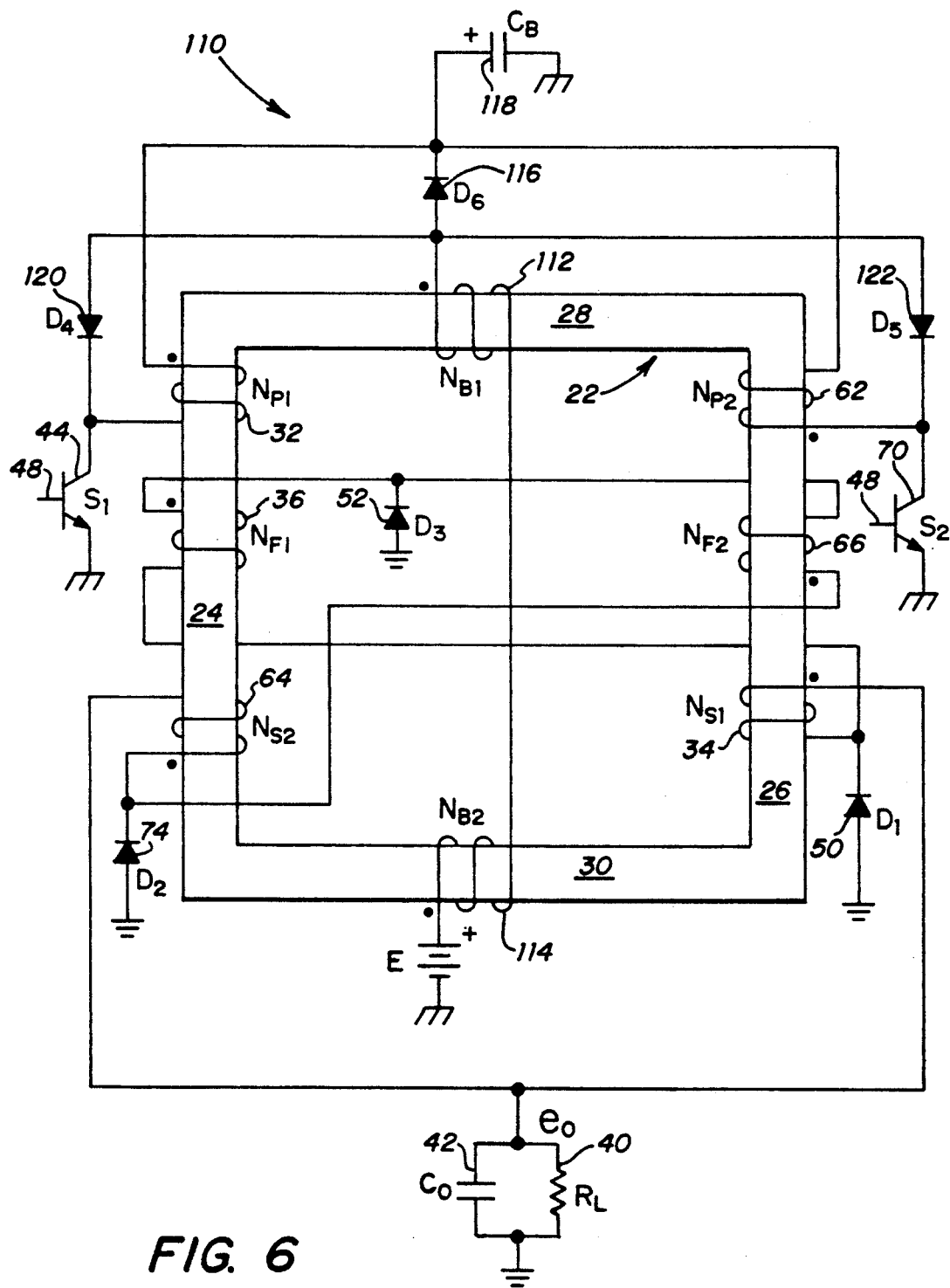
FIG. 6 is a schematic and electrical circuit diagram of an integrated magnetic power converter in accordance with the push pull with boost embodiment of the present invention.
Figure 7:
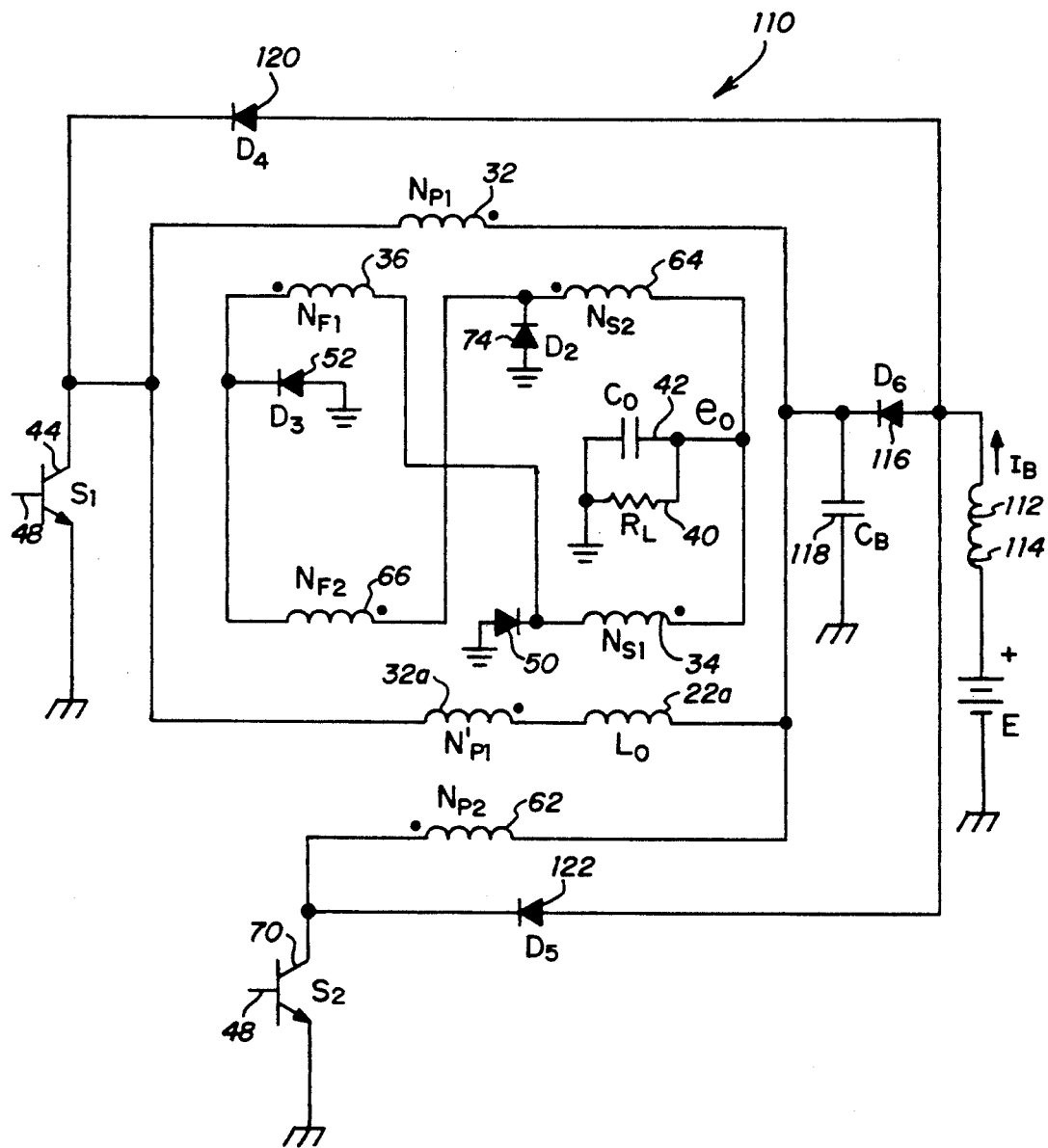
FIG. 7 represents an electric circuit equivalent of the integrated magnetic power converter shown in FIG. 6.

Referring now simultaneously to FIGS. 6 and 7, a push pull with boost embodiment of the present magnetic power converter is illustrated, and is generally identified by the numeral 110. Like numerals are utilized for like and corresponding components previously is similar in topology to converter 20, but adds boost windings 112 and 114 wound around legs 28 and 30, respectively, of core 22. Windings 112 and 114 are serially interconnected and are connected to a diode 116 and capacitor 118. Additionally, diodes 120 and 122 are interconnected to switches 44 and 70, respectively. The D.C. transfer function of converter 110 is as follows:

$$e_o = E \frac{N_S}{N_P} \left[ \frac{D}{1-D} \right] \quad (4)$$

Figure 8:
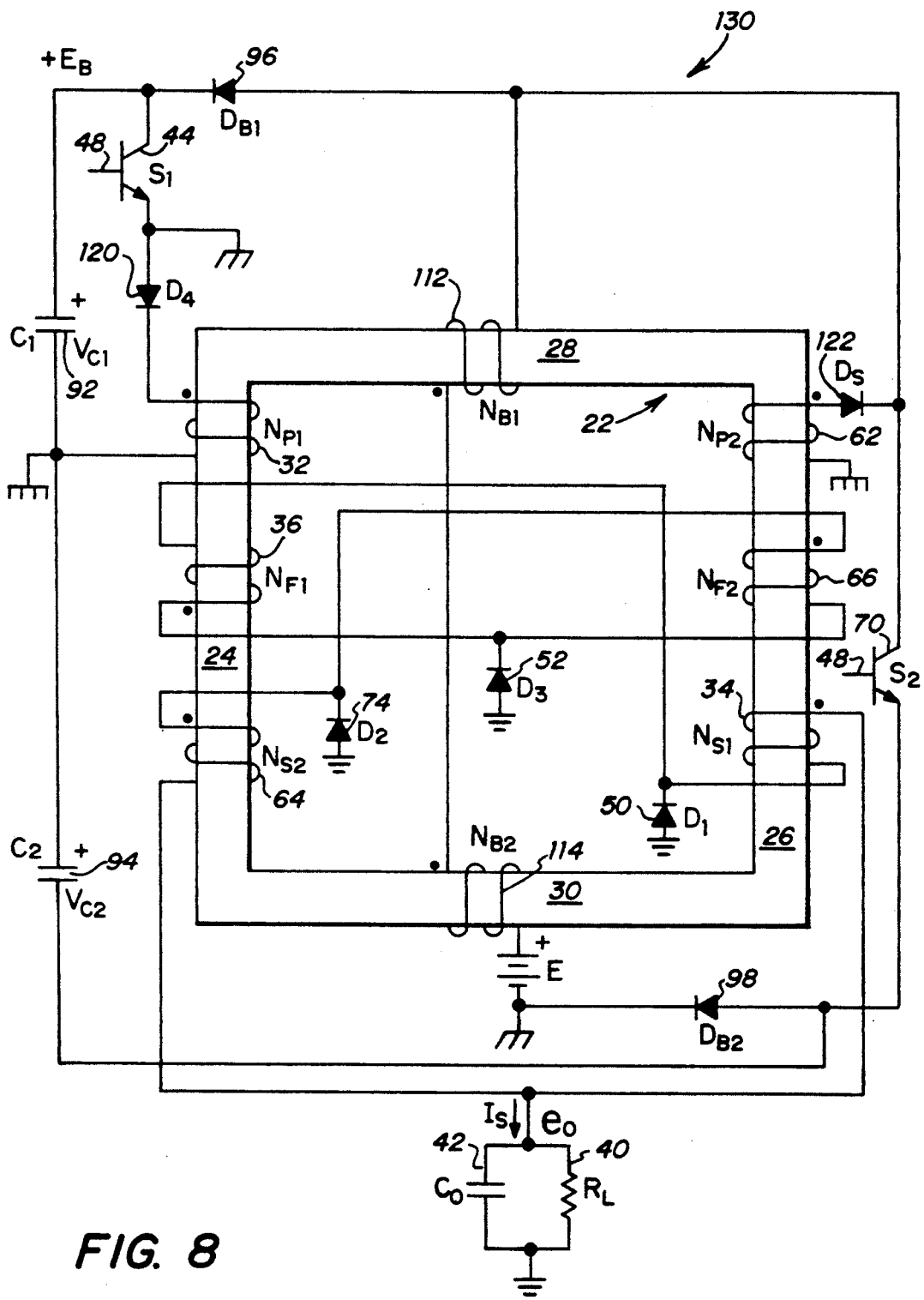
FIG. 8 is a schematic and electrical circuit diagram of an integrated magnetic power converter in accordance with the half bridge with boost embodiment of the present invention.
Figure 9:
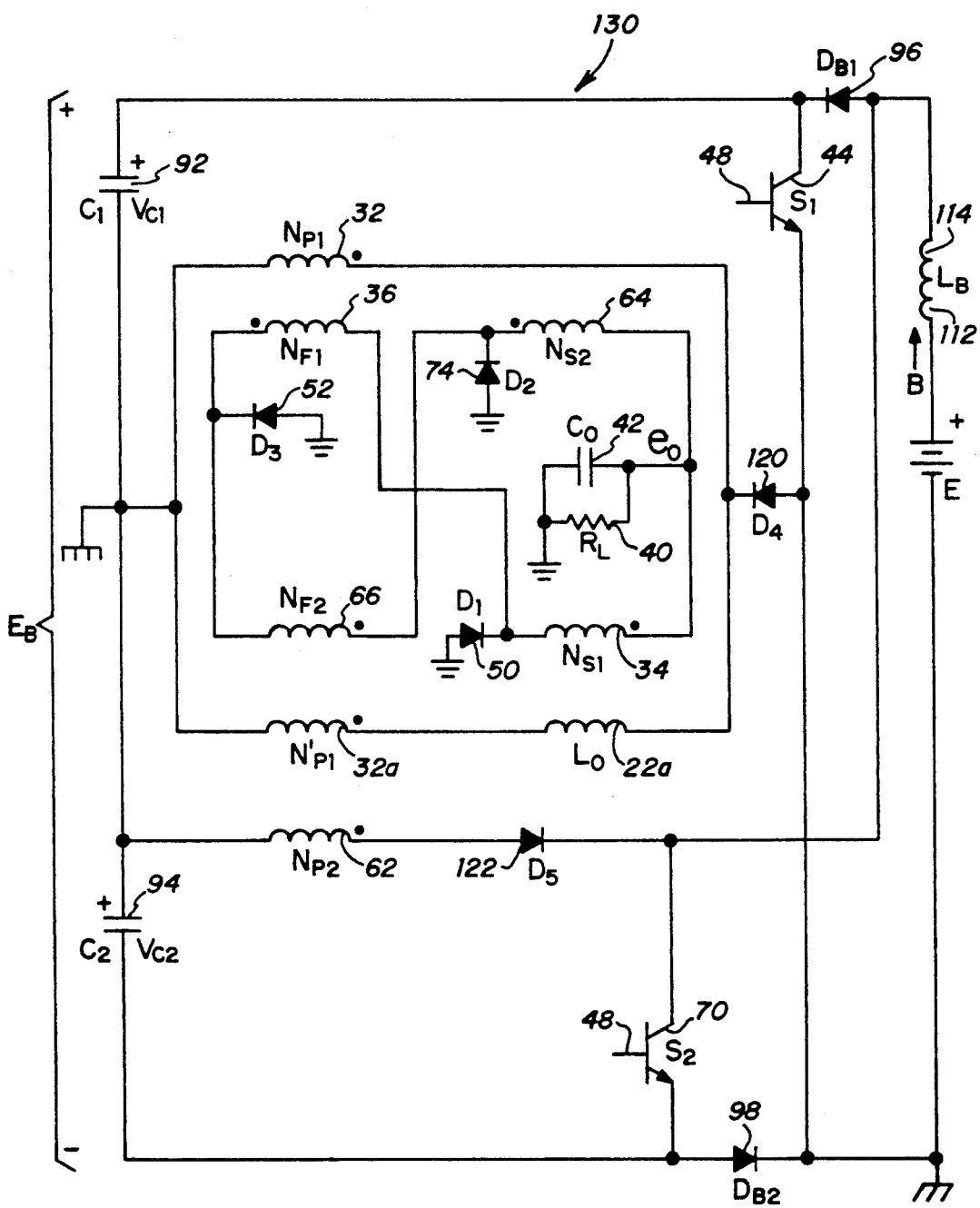
FIG. 9 represents an electric circuit equivalent of the integrated magnetic power converter shown in FIG. 8.

Referring now simultaneously to FIGS. 8 and 9, a half bridge with boost embodiment of the present integrated magnetic converter is illustrated, and is generally identified by the numeral 130. Like numerals are utilized for like and corresponding components previously identified with respect to converter 90. Converter 130 adds windings 112 and 114 to the topology of converter 90. The D.C. transfer function for converter 130 is as follows:

$$e_o = \frac{E}{2} \frac{N_S}{N_P} \left[ \frac{D}{1-D} \right] \quad (5)$$

Converters 130 and 110 have nonpulsating input and output current and achieves a high D.C. gain due to the boost circuit. When both switches 44 and 70 are off, the boost inductor current flows through both diodes 96 and 98. When either switch 44 or 70 is on, the load current on the primary windings 32 and 62 flow through either diode 120 or diode 122 and the boost inductor charging current flows through either diode 96 or 98. Therefore, in the continuous inductor current mode, two primary diodes are always conducting. Diodes 120 and 122 allow the converter 130 to reset.

Figure 10:
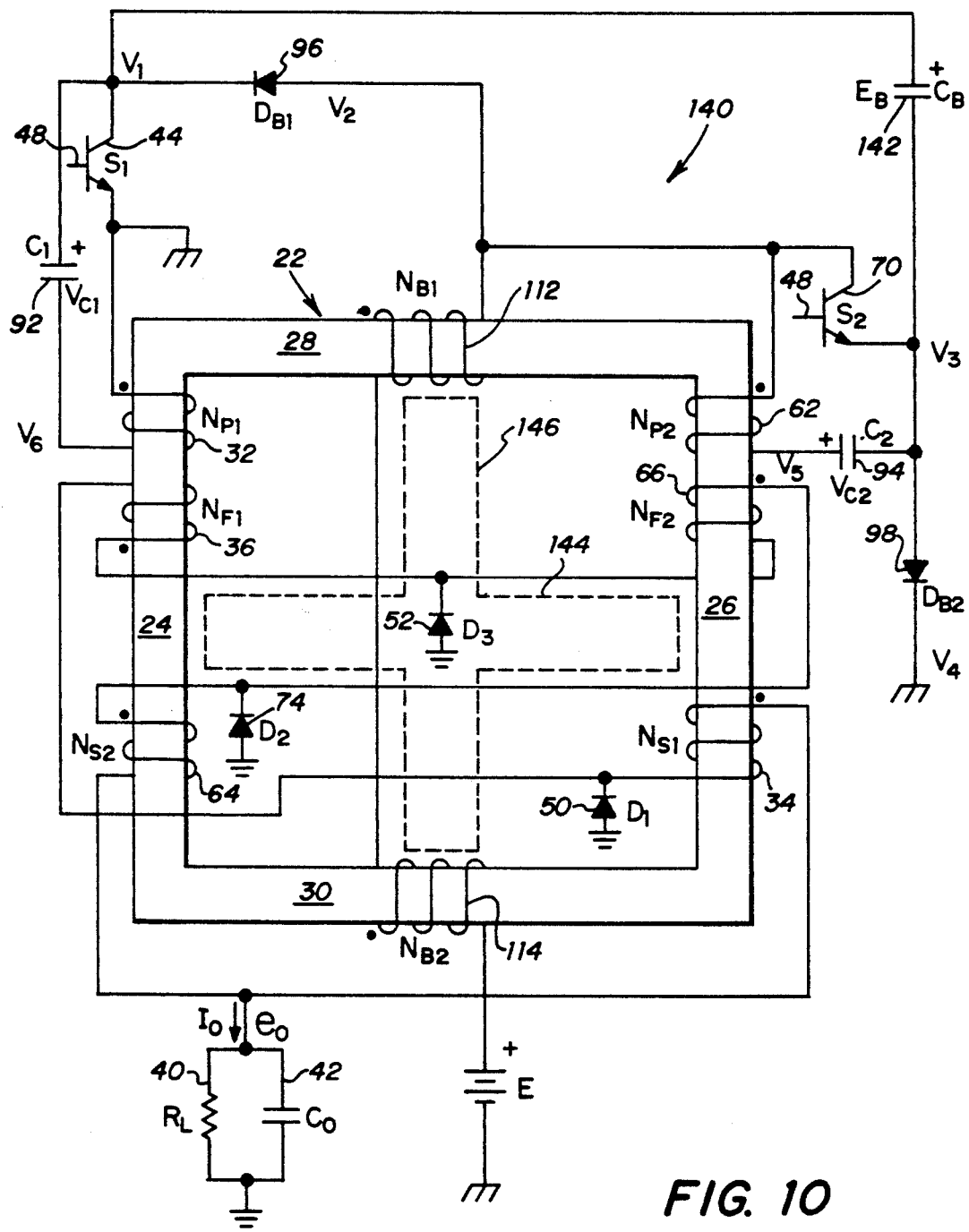
FIG. 10 is a schematic and electrical circuit diagram of an integrated magnetic power converter in accordance with the four state embodiment of the present invention.
Figure 11:
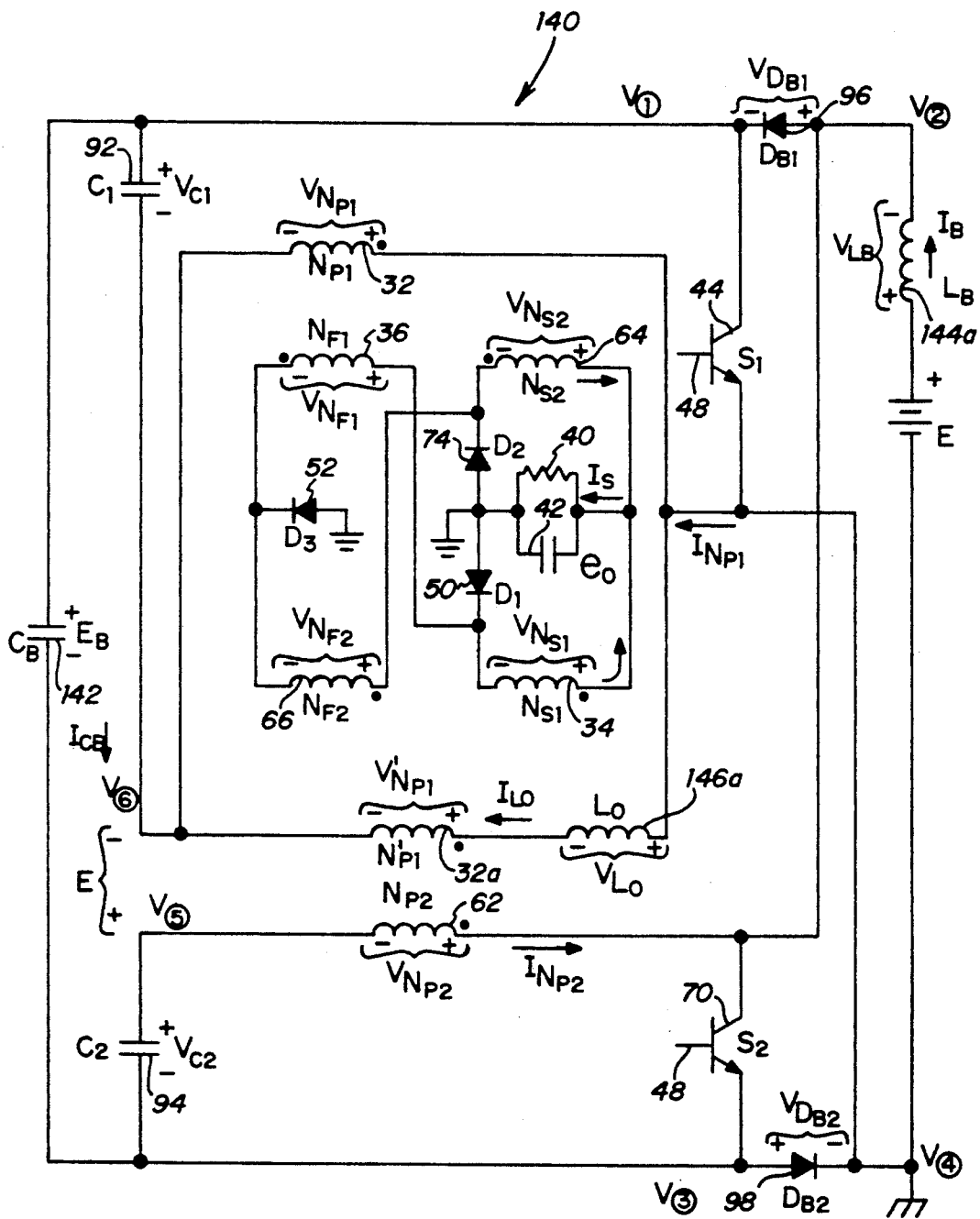
FIG. 11 represents an electric circuit equivalent of the integrated magnetic power converter shown in FIG. 10.

Referring now simultaneously to FIGS. 10 and 11, the further embodiment of the present integrated magnetic converter is illustrated, and is generally identified by the numeral 140. Converter 140 operates as a four state converter. Converter 140 is similar to converter 130 only, wherein like numerals are utilized for like and corresponding elements. Additionally, converter 140 includes a capacitor 142.

Converter 140 operates in four distinct states. The first state is where switch 44 is on and 70 is off. The second state is where switch 44 turns off and switch 70 is off. The third state is where switch 70 is on and switch 44 is off. The fourth state is where switch 70 turns off and switch 44 is off.

The dotted lines in FIG. 10 are illustrated to model the approximate leakage flux reluctance paths of converter 140. The horizontal path 144 is the leakage flux path for windings 112 and 114 which comprise the boost inductor 144a (FIG. 11). The vertical dotted line 146 is the equivalent of the leakage path for windings 32 to 34 and windings 62 to winding 64 which comprise the bulk energy storage inductor 146a (FIG. 11). Either of the dotted lines 144 and 146 could become a solid piece of core 22 with a gap such that core 22 becomes a standard "E" core with a center leg having a gap.

The following voltages appear across the various windings and diodes in State 1 where switch 44 is on and 70 is off:

$$V_{NP1} = \frac{N_P}{N_S} e_o \text{ (Winding } N_{P1} \text{ and } N_{S1} \text{ conduct)} \quad (6)$$

$$V_{NF2} = \frac{N_P}{N_S} e_o \tag{7}$$

$$V_{NF2} = e_o \tag{8}$$

$$V_{NS1} = e_o \tag{9}$$

$$V_{NP1} = V_c \tag{10}$$

$$V_{NF1} = -\frac{N_{F1}}{N_P} V_c = -\frac{N_S}{N_P} V_c \text{(Since } N_{S1} = N_{S2} = N_{F2} = N_S\text{)} \tag{11}$$

$$V_{NS2} = -\frac{N_S}{N_P} V_c \tag{12}$$

$$V_{LO} = V_c - \frac{N_P}{N_S} e_o \tag{13}$$

$$V_{LB} = E \tag{14}$$

$$V_{DB1} = +(\text{Forward Biased}) \tag{15}$$

$$V_{DB2} = -E_B(\text{Back Biased}) \tag{16}$$

$$V_1 = V_2 = 0(\text{Neglecting } D_{B1} \text{ Forward Drop}) \tag{17}$$

$$V_3 = -E_B \tag{18}$$

$$V_4 = 0 \tag{19}$$

$$V_5 - V_6 = E \tag{20}$$

$V_1$, $V_2$, $V_3$, $V_4$, $V_5$, $V_6$ are relative to power source (E) ground.

In State 1, diode 50 conducts and diodes 52 and 74 are back biased and nonconducting. Diode 96 is conducting and winding inductor 144a (FIG. 11) is being charged by the source, E, through switch 44 and diode 96. Capacitor 92 is being discharged into inductor 146a (FIG. 11) and the exciting inductance of winding 32 (not shown). Current is supplied to the output $e_0$ through windings 32a and 34 and is represented as follows:

$$I_S = \frac{N_P}{N_S} (I_{Lo} - I_{CB}) \tag{21}$$

Where $I_{CB}$ is the charging current for capacitor 142, flowing through winding 62, capacitor 94 and, diode 96. Thus, when either switch is on, capacitors 94 and 92 are being discharged and capacitor 142 is being charged. The converse is the case when both switches are off.

Since $$V_{NF2} = \frac{N_P}{N_S} e_o \tag{22}$$

then, $$-E_B + V_{C2} + \frac{N_P}{N_S} e_o = 0 \tag{23}$$

In State 1, capacitor 142 is being charged, and current flows through capacitor 94, winding 62, and diode 96 into capacitor 142.

Now consider State 2 of converter 140 where switch 44 turns off and switch 70 remains off. The current flowing through the exciting inductance in parallel with winding 32, immediately reverses the polarity of the voltage across winding 32, but this voltage is clamped by winding 64 to:

$$V_{NP1} = -\frac{N_P}{N_S} e_o \tag{24}$$

Therefore, the voltage across winding 36 equals the voltage across winding 64 which is equal to $e_0$. Therefore, State 2, the voltage across winding 34 is 0 which in turn forces the voltage across windings 66, 32a, and 62 to 0. The sudden switching of the voltage across winding 62 to 0 diverts the boost inductor current into winding 62 through capacitor 94, capacitor 142, capacitor 92 and winding 32. Current is flowing in the negative direction through winding 62 and winding 32. Capacitors 92 and 94 are being charged and capacitor 142 is being discharged. Neither diodes 96 or 98 are conducting. This boost inductor component of the total output current is transferred to the output through winding 66 and winding 64 as:

$$I_{BO} = \frac{N_P}{N_S} I_B \tag{25}$$

The total output current in State 2 is:

$$I_S = \frac{N_P}{N_S} I_B + \frac{N_P}{N_S} I_{Lo} \tag{26}$$

All four secondary windings, 34, 36, 66 and 64 are conducting.

The voltages in State 2 are given as follows:

$$V_{NP1} = 0 \tag{27}$$

$$V_{NP2} = 0 \tag{28}$$

$$V_{NF2} = 0 \tag{29}$$

$$V_{NS1} = 0 \tag{30}$$

$$V_{NP1} = -\frac{N_P}{N_S} e_o \tag{31}$$

$$V_{NF1} = e_o \tag{32}$$

$$V_{NS2} = e_o \tag{33}$$

$$V_{LO} = -\frac{N_P}{N_S} e_o \tag{34}$$

$$V_{LB} V_c \tag{35}$$

$$V_{DB1} = -(E_B - V_c)(\text{Back Biased}) \tag{36}$$

$$V_{DB2} = 0(\text{Neither Forward nor Back Biased}) \tag{37}$$

$$V_1 = E_B \tag{38}$$

$$V_2 = V_{C2} \tag{39}$$

$$V_3 = 0 \tag{40}$$

$$V_4 = 0 \tag{41}$$

$$V_5 - V_6 = E \tag{42}$$

In State 3, switch 70 turns on and switch 44 remains off. This state is the mirror image of State 1. The following voltages exist in State 3:

$$V_{NP1} = -V_{C2} \tag{43}$$

$$V_{NP2} = -V_c \tag{44}$$

$$V_{NF2} = -\frac{N_S}{N_P} V_c \tag{45}$$

$$V_{NS1} = -\frac{N_S}{N_P} V_c \tag{46}$$

$$V_{NP1} = -\frac{N_S}{N_P} e_o \tag{47}$$

$$V_{NF1} = e_o \tag{48}$$

$$V_{NS2} = e_o \tag{49}$$

$$V_{LO} = V_C - \frac{N_P}{N_S} e_o \tag{50}$$

$$V_{LB} = E \tag{51}$$

$$V_{DB1} = -E_B \tag{52}$$

$$V_{DB2} = +0 (\text{Neglect Forward Drop}) \tag{53}$$

$$V_1 = -E_B \tag{54}$$

$$V_2 = 0 \tag{55}$$

$$V_3 = 0 \tag{56}$$

$$V_4 = 0 \tag{57}$$

$$V_5 - V_6 = E \tag{58}$$

In State 3, capacitor 94 is being discharged. Current flows to load 40 via windings 62, 32a, 32, and 64. Current flowing to the load 40, is given by the following:

$$I_S = \frac{N_P}{N_S} (I_{LO} - I_{CB}) \tag{59}$$

During State 3, capacitor 142 is being charged. Current flows through winding 32, capacitor 92 and diode 98 into capacitor 142.

The voltage across capacitor 92 is given by:

$$V_{C1} = E_B - \frac{N_P}{N_S} e_o \tag{60}$$

The voltage across capacitor 94 is given by:

$$V_{C2} = E_B - \frac{N_P}{N_S} e_o \tag{61}$$

Therefore, it can be seen that the Capacitor 92 and 94 voltages must be equal regardless of any circuit imbalance or nonsymmetry and no additional equalizing circuitry is needed in the converter 140.

In State 4, which is the mirror image of State 2, the exciting inductance in parallel with winding 32a, immediately reverses the polarity of the voltage across winding 32a and winding 62, but this voltage is clamped by winding 34. The voltage across winding 32 suddenly goes to 0 and the boost current is diverted again through windings 62, capacitor 94, capacitor 142, capacitor 92 and winding 32 to primary ground. The State 4 circuit voltages are as follows:

$$V_{NP1} = +\frac{N_P}{N_S} e_o \tag{62}$$

$$V_{NP2} = +\frac{N_P}{N_S} e_o \tag{63}$$

$$V_{NF2} = e_o \tag{64}$$

$$V_{NS1} = e_o \tag{65}$$

$$V_{NP1} = 0 \tag{66}$$

$$V_{NF1} = 0 \tag{67}$$

$$V_{NS2} = 0 \tag{68}$$

$$V_{LO} = -\frac{N_P}{N_S} e_o \tag{69}$$

$$V_{LB} = V_c \tag{70}$$

$$V_{DB1} = 0 \tag{71}$$

$$V_{DB2} = -(E_B - V_c) \tag{72}$$

$$V_1 = V_{c1} \tag{73}$$

$$V_2 = V_{c2} \tag{74}$$

$$V_3 = (V_{c1} - E_B) = V_{DB2} \tag{75}$$

$$V_4 = 0 \tag{76}$$

$$V_5 - V_6 = E \tag{77}$$

In all four states the difference between the voltages at points 5 and 6 is equal to the source voltage and $V_{C1} = V_{C2}$. Therefore, $$E_B = 2V_c - E \tag{78}$$

and, since $$V_C = E_B - \frac{N_P}{N_S} e_o \tag{79}$$

then:

$$E_B = 2\frac{N_P}{N_S} e_o + E; \tag{80}$$

and $$V_C = \frac{N_P}{N_S} e_o + E \tag{81}$$

The D.C. transfer function of converter 140 is given by:

$$e_o = \frac{\frac{N_S}{N_P} ED}{(1-D)} \tag{82}$$

The voltage waveforms associated with converter 140 are illustrated in FIGS. 12 and 13. In FIG. 12, $V_{S2}$ is the drain to source voltage of switch 72. $V_{S1}$ is the drain to source voltage of switch 44. $I_{LOP}$ is the peak primary current. $I_{BP}$ is the peak $L_B$ current. FIG. 12d represents $I_{NP1}$. The buck current is shown at 160. The boost current is shown at 162 during which time capacitor 142 is being discharged. Capacitor 142 is charged at 164. FIG. 12e represents $I_{NP2}$. The buck current is shown at 166. The boost current is shown at 168. Capacitor 142 is charged at 170.

Figure 13A:
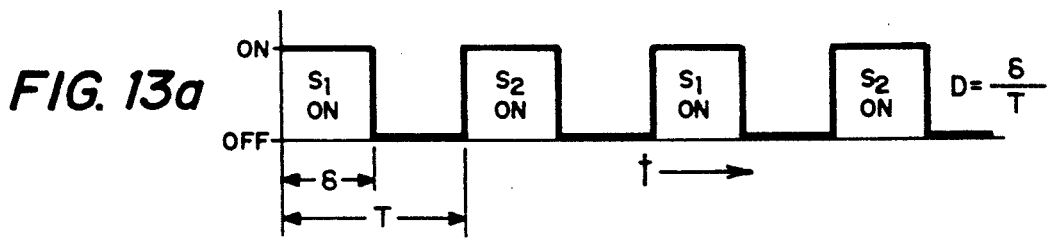
Figure 13B:
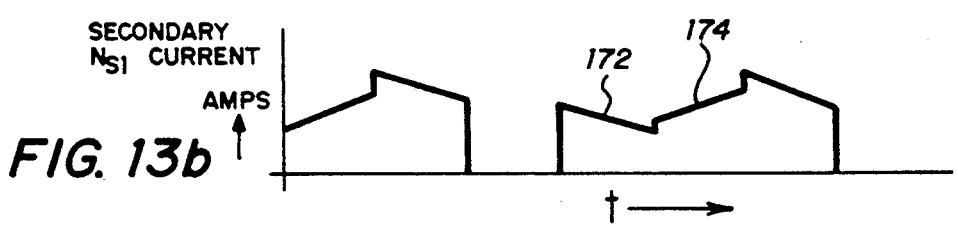
Figure 13C:
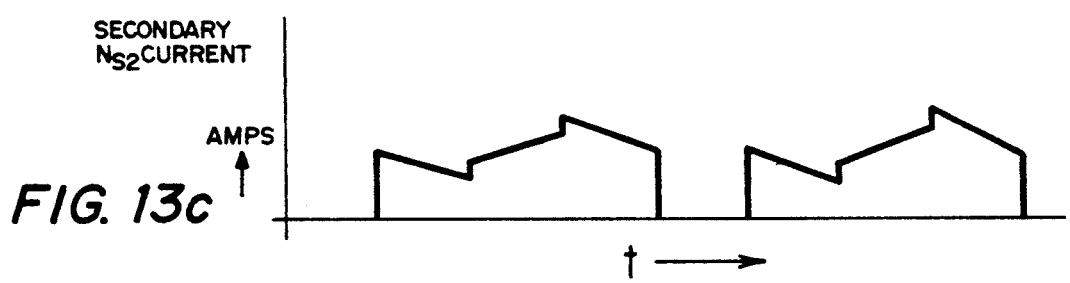
Figure 13D:
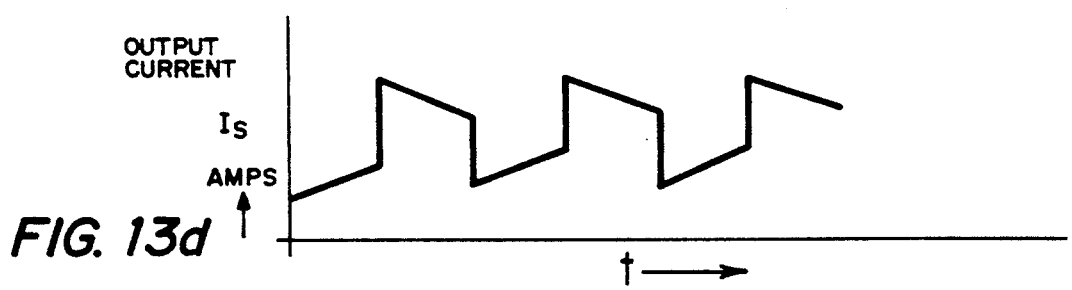
Figure 13E:
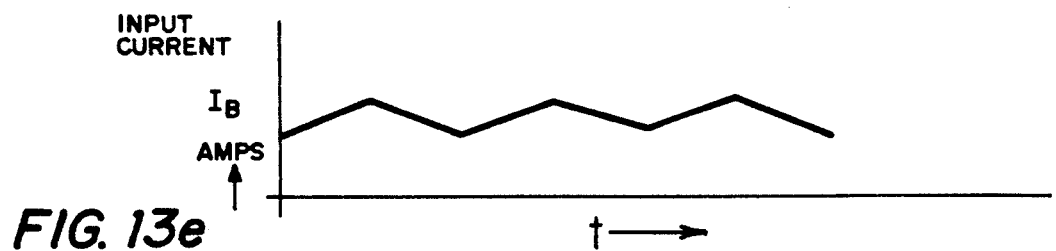

In FIG. 13, FIG. 13b represents $I_{NS1}$. FIG. 13c represents $I_{NS2}$. FIG. 13d represents the sum of $I_{NS1}$ and $I_{NS2}$. The boost current is shown at 172. The buck current is shown at 174.

The present converter 140 allows for a wide input range and efficiency in power utilization. Converter 140 operates as a buck topology when either switches 44 or 70 are on. When either switch 44 or 70 is off, converter 140 operates as a hybrid buck-boost topology. These topologies operate together, simultaneously. The present power converters result in a simple, electrically efficient and flexible power converter in which the magnetic weight, size and cost are decreased while not compromising desired performance features.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An integrated magnetic power converter for supplying power to a load comprising:
    a continuous magnetic structure having first and second oppositely disposed legs and third and fourth oppositely disposed legs and magnetic path therebetween;
    a first winding wound on said first leg;
    a second winding wound on said second leg and connected to the load;
    a third winding in series with said second winding and wound on said first leg;
    first circuit means connected to said first winding for supplying energy to the power converter;
    second circuit means connected in series with said second and third windings for transferring energy to the load;
    third circuit means coupled to said second and third windings for transferring energy from said second winding to the load, such that when energy is supplied to said first winding for transformation to said second winding, a magnetic flux is produced in said magnetic path for power transfer to the load and an amount of energy is stored in the area surrounding said magnetic structure and said magnetic path, and when energy applied to said first winding is removed, said stored energy induces a magnetic flux in said magnetic path and energy is transferred to the load via said second and third windings and said third circuit means;
    a fourth winding wound on said second leg;
    a fifth winding wound on said first leg and connected to the load;
    a sixth winding in series with said fifth winding and wound on said second leg;
    fourth circuit means connected to said fourth winding for supplying energy to the power converter;
    fifth circuit means coupled to said fifth and sixth windings for transferring energy to the load;
    sixth circuit means connected in series with said fifth and sixth windings for transferring energy from said fifth winding to the load, such that when energy is supplied to said fourth winding for transformation to said fifth winding, a magnetic flux is produced in said magnetic path for power transfer to the load and an amount of energy is stored in the area surrounding said magnetic structure and said magnetic path, and when energy applied to said fourth winding is removed, said stored energy induces a magnetic flux in said magnetic path and energy is transferred to the load via said fifth and sixth windings and said sixth circuit means;
    said third circuit means includes means for preventing current flow in said third winding while energy is being supplied to said first winding to thereby permit the storage of energy around said magnetic structure and to permit current flow from said third winding to the load when energy supplied to said first winding is removed, thereby generating an induced current in said second winding;
    said third circuit means providing current for said third winding when energy is removed from said first winding, thereby removing voltage from said fourth winding to allow current to flow in said first and fourth windings without supplying energy through said first and fourth windings;
    said sixth circuit means includes means for preventing current flow in said sixth winding while energy is being supplied to said fourth winding to thereby permit the storage of energy around said magnetic structure and to permit current flow from said sixth winding to the load when energy supplied to said fourth winding is removed, thereby generating an induced current in said fifth winding;
    said sixth circuit means providing current for said sixth winding when energy is removed from said fourth winding, thereby removing voltage from said first winding to allow current to flow in said first and fourth windings without supplying energy through said first and fourth windings;
    a seventh winding wound on said third leg; and
    an eighth winding wound on said fourth leg, said seventh and eighth windings being in series.

2. The power converter of claim 1 wherein said first circuit means is connected to said first winding for preventing periodically occurring spaced power stroke time periods, such that when current flows in said first winding during a power stroke time period, current flows only in said second winding and energy is stored in the area around said magnetic structure in response to said current and when current flows in said third winding during a non-power stroke time period, current flows in said second winding.

3. The power converter of claim 2 wherein said third circuit means includes rectifier means in series with said second and third windings for permitting current to flow to the load only during time periods between said power stroke time periods.

4. The power converter of claim 2 wherein said second circuit means includes rectifier means in series with said second winding means for permitting current to flow to the load during power stroke time periods.

5. The power converter of claim 1 wherein said fourth circuit means is connected to said fourth winding for providing periodically occurring spaced power stroke time periods, such that when current flows in said fourth winding during a power stroke time period, current flows only in said fifth winding and energy is stored in the area around said magnetic structure in response to said current and when current flows in said sixth winding during a non-power stroke time period, current flows in said fifth winding.

6. The power converter of claim 5 wherein said sixth circuit means includes rectifier means in series with said fifth and sixth windings for permitting current to flow to the load only during time periods between said power stroke time periods.

7. The power converter of claim 5 wherein said fifth circuit means includes rectifier means in series with said fifth winding means for permitting current to flow to the load during power stroke time periods.

* * * * *

UNITED STATES PATENT AND TRADEMARK OFFICE
CERTIFICATE OF CORRECTION

PATENT NO. : 5,208,739
DATED : May 4, 1993
INVENTOR(S) : Sturgeon, Clayton L.

It is certified that error appears in the above-identified patent and that said Letters Patent is hereby corrected as shown below:

Column 7, equation (11), replace $$V_{NF1} = - \frac{N_{F1}}{N_P} V_c = - \frac{N_S}{N_P} V_c (Since\ N_{S1} = N_{S2} = N_{F2} = N_S) \tag{1}$$

with $$V_{NF1} = - \frac{N_{F1}}{N_P} V_c = - \frac{N_S}{N_P} V_c (Since\ N_{S1} = N_{S2} = N_{F1} = N_{F2} = N_S) \tag{2}$$

Column 7, line 37, delete "winding".

UNITED STATES PATENT AND TRADEMARK OFFICE
CERTIFICATE OF CORRECTION

PATENT NO. : 5,208,739
DATED : May 4, 1993
INVENTOR(S) : Sturgeon, Clayton L.

It is certified that error appears in the above-identified patent and that said Letters Patent is hereby corrected as shown below:

Column 8, equation (55), replace $$V_{LB} V_C \qquad (3)$$

with $$V_{LB} = V_C \qquad (4)$$

Column 9, equation (47), replace $$V_{NP1} = -\frac{N_S}{N_P} e_o \qquad (5)$$

with $$V_{NP1} = -\frac{N_P}{N_S} e_o \qquad (6)$$

UNITED STATES PATENT AND TRADEMARK OFFICE
CERTIFICATE OF CORRECTION

PATENT NO. : 5,208,739

DATED : May 4, 1993

INVENTOR(S) : Sturgeon, Clayton L.

It is certified that error appears in the above-identified patent and that said Letters Patent is hereby corrected as shown below:

```
Column 12, line 49, replace "preventing" with
--providing--.
```

Signed and Sealed this

Eighth Day of March, 1994

Attest:

BRUCE LEHMAN

Attesting Officer

Commissioner of Patents and Trademarks